(12) United States Patent
Yamada

(10) Patent No.: US 7,804,650 B2
(45) Date of Patent: Sep. 28, 2010

(54) LENS SHEET FOR USE IN BACKLIGHT, BACKLIGHT AND DISPLAY DEVICE USING THE SAME

(75) Inventor: Yukinori Yamada, Ibaraki (JP)

(73) Assignee: Hitachi Maxell, Ltd., Ibaraki-shi, Osaka (JP)

( * ) Notice: Subject to any disclaimer, the term of this patent is extended or adjusted under 35 U.S.C. 154(b) by 323 days.

(21) Appl. No.: 12/067,281

(22) PCT Filed: Apr. 18, 2007

(86) PCT No.: PCT/JP2007/058454

§ 371 (c)(1),
(2), (4) Date: Mar. 18, 2008

(87) PCT Pub. No.: WO2007/125803

PCT Pub. Date: Nov. 8, 2007

(65) Prior Publication Data

US 2009/0180191 A1 Jul. 16, 2009

(30) Foreign Application Priority Data

Apr. 28, 2006 (JP) ............................. 2006-126839

(51) Int. Cl.
*G02B 27/10* (2006.01)
*G03B 21/60* (2006.01)

(52) U.S. Cl. ...................... 359/622; 359/625; 359/626; 359/455

(58) Field of Classification Search ................ 359/618, 359/619, 621, 622, 623, 625, 626, 454, 455
See application file for complete search history.

(56) References Cited

U.S. PATENT DOCUMENTS

| 4,805,984 | A | 2/1989 | Cobb, Jr. |
| 2005/0094295 | A1 | 5/2005 | Yamashita et al. |
| 2005/0140634 | A1 | 6/2005 | Takatori |
| 2008/0297906 | A1 | 12/2008 | Takahashi et al. |

FOREIGN PATENT DOCUMENTS

| CN | 1336559 A | 2/2002 |
| JP | 3262230 B2 | 3/2002 |
| JP | 2004-46076 A | 2/2004 |
| JP | 2005-208600 A | 8/2005 |
| WO | 2005/003851 A1 | 1/2005 |
| WO | 2005/124399 A1 | 12/2005 |
| WO | 2006/013491 A1 | 2/2006 |

*Primary Examiner*—Jack Dinh
(74) *Attorney, Agent, or Firm*—Birch, Stewart, Kolasch & Birch, LLP

(57) ABSTRACT

A lens sheet according to the invention includes a base film, a lenticular lens resin layer, a prism resin layer, and a filling resin layer. The lenticular lens resin layer includes a plurality of cylindrical lenses formed on one surface of the base film and arranged. The prism resin layer includes a plurality of prisms formed on the other surface of the base film and arranged, and has a lower refractive index than the refractive index of the base film. The filling resin layer is filled on a surface of the prism resin layer provided with the arranged prisms and has a higher refractive index than the refractive index of the prism resin layer. Therefore, the lens sheet according to the invention can restrain side lobe light emitted obliquely to the front surface.

9 Claims, 12 Drawing Sheets

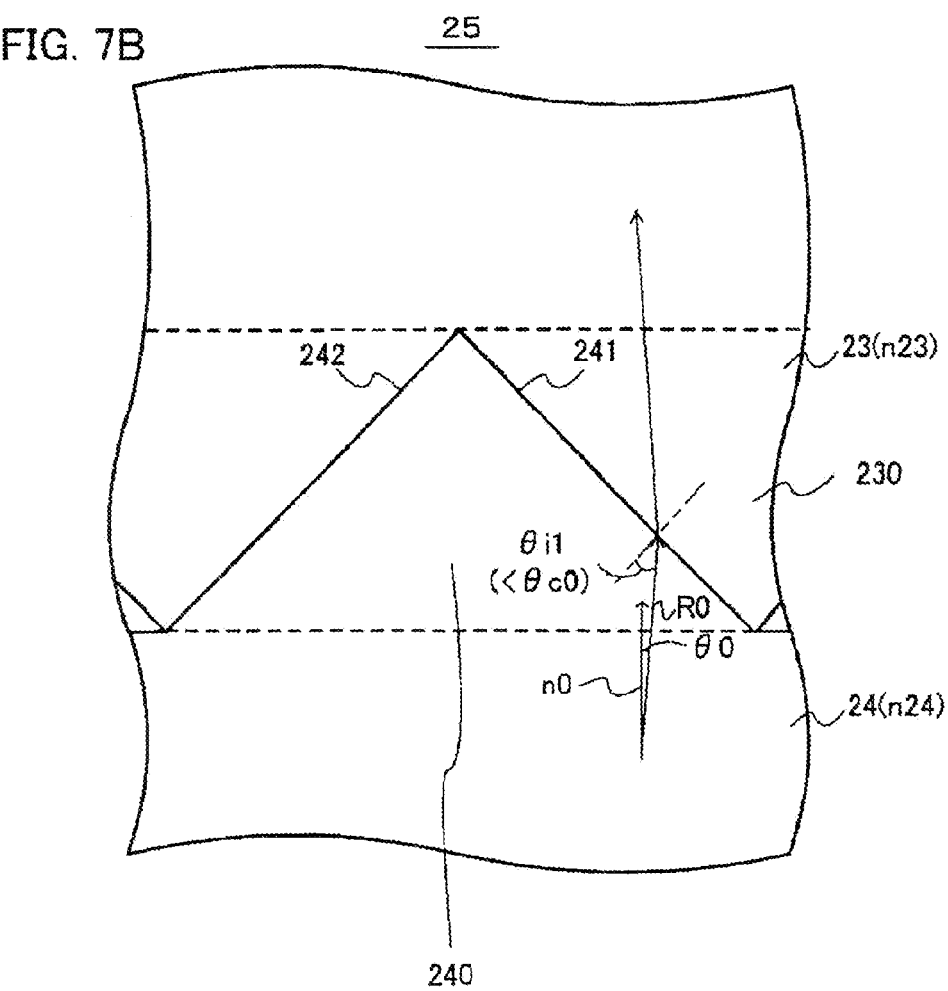

LENS SHEET FOR USE IN BACKLIGHT, BACKLIGHT AND DISPLAY DEVICE USING THE SAME

TECHNICAL FIELD

The present invention relates to a lens sheet, and a backlight and a display device using the same. The invention more specifically relates to a lens sheet capable of improving the front side brightness and used in a backlight, and a backlight and a display device using the same.

BACKGROUND ART

In the field of display devices such as a liquid crystal display, there is a demand for improved front side brightness. Therefore, in a backlight for use in such a display, a lens sheet used to collect a light beam from a surface light source to the front surface and improve the front side brightness is provided. A prism sheet as disclosed by JP 3262230 B is generally used as such a lens sheet.

With reference to FIGS. 18 and 19, the conventional prism sheet 100 has prism liners PL arranged (hereinafter simply as "prisms") on its surface. The refractive index of the prism sheet 100 is about 1.5 to 1.6. Diffused light R100 from a surface light source is refracted at the plane PL of a prism and emitted as it is deflected to the front surface direction. In this way, the prism sheet 100 improves the front side brightness of the display by collecting the diffused light to the front surface.

However, the prism sheet 100 can improve the front side brightness while it also raises the brightness in the front side oblique direction. The solid line in FIG. 20 shows the angular distribution of brightness for the vertical viewing angle of the prism sheet 100 having the prisms PL arranged in the vertical direction (that corresponds to the vertical direction of the display screen). With reference to FIG. 20, the relative brightness has a first peak at a viewing angle in the range of ±30° and a second peak (so-called side lobe) at a viewing angle of +50° or more and at a viewing angle of −50° or less in the front surface oblique direction. Unlike a natural angular distribution of brightness in which the brightness is peaked at a viewing angle of 0° and gradually lowered as the viewing angle widens, the angular distribution of brightness denoted by the solid line in FIG. 20 is unnatural. The user might have unnatural impressions because of the side lobes in some cases as he/she watches the display. Therefore, it is preferable that light that forms side lobes (hereinafter referred to as "side lobe light") can be restrained from being emitted so that the side lobes can be restrained.

Light for the amount of side lobes cannot be collected to the front surface and therefore the improvement of the surface side brightness using a single prism sheet has its limit. In order to further improve the front side brightness, two prism sheets must be placed on each other and provided on the surface light source, which complicates the manufacturing process.

Furthermore, a prism has a triangular cross section and therefore can easily be damaged during its manufacture, transport and installment to a backlight, particularly at its apex. Such a defect is likely to result in a bright point or a dark point on the display. In order to prevent such defects, the prism sheet 100 before being installed into a display device must be provided with a protection film.

DISCLOSURE OF THE INVENTION

It is an object of the present invention to provide a lens sheet capable of improving the front side brightness as a single sheet.

Another object of the invention is to provide a lens sheet capable of restraining side lobe light emitted obliquely to the front surface.

Yet another object of the invention is to provide a lens sheet free of a protection film.

A lens sheet according to the invention is for use in a backlight. The lens sheet according to the invention includes a base film, a lenticular lens resin layer, a prism resin layer, and a filling resin layer. The lenticular lens resin layer is formed on one surface of the base film and includes a plurality of cylindrical lenses arranged. The prism resin layer is formed on the other surface of the base film, includes a plurality of prisms arranged and has a lower refractive index than the refractive index of the base film. The filling resin layer is filled on a surface of the prism sheet resin layer provided with the arranged prisms and has a higher refractive index than the refractive index of the prism resin layer. Here, the base film may be any of a film type, a sheet type, and a plate type.

In the lens sheet according to the invention, an incident light beam is collected stepwise. The refractive index of the filling resin layer is higher than the refractive index of the prism resin layer, and therefore diffused light incident to the filling resin layer is refracted at the prism plane and collected to the front surface. Then, the refractive index of the base film is higher than the refractive index of the prism resin layer and therefore a light beam incident to the base film from the prism resin film is refracted at the surface of the base film and collected more to the front surface. Furthermore, the light beam emitted from the base film is let into the lenticular lens resin layer, refracted at the convex surface of the cylindrical lens and collected to the front surface for emission. In this way, the lens sheet according to the invention includes the prisms and the cylindrical lenses, and the refractive index of the prism resin layer is smaller than the refractive indexes of the base film and filling resin layer, so that an incident light beam can be collected stepwise inside the lens sheet. Therefore, the front side brightness can be improved using the single lens sheet.

Furthermore, the lens sheet according to the invention can restrain side lobes. Side lobes can be restrained probably for the following reasons.

A side lobe in the prism sheet is formed by light emitted with a wide angle to the normal line to the prism sheet (hereinafter as "side lobe light"). In the side lobe light, a light beam totally reflected at one side plane of the planes of the prism (two side planes) is transmitted through the other side plane and emitted. The lens sheet according to the invention has the filling resin layer filled between the plurality of prisms of the prism resin layer. More specifically, the plurality of prisms are formed also on the surface of the filling resin layer. The refractive index of the prism resin layer is smaller than the filling resin layer and yet larger than the refractive index of the air. Therefore, in the prism plane on the filling resin layer, the critical angle is larger than that of the conventional prism sheet. Therefore, at the prism plane on the filling resin layer, the critical angle is greater than that of the conventional prism sheet. Therefore, the possibility of the light beam to be totally reflected by the side plane of the prism on the filling resin layer is reduced, so that side lobes can be restrained.

In the cylindrical lenses formed on the surface of the lens sheet according to the invention, it is less likely that light totally reflected at one surface is transmitted at the other surface unlike the prism, and therefore if light totally reflected once comes into the lens convex surface again, it is more often the case that the light is totally reflected again. Therefore, side lobe light outgoing with a wide angle with respect to the normal line to the lens sheet can be restrained.

The lenses formed on the surface of the lens sheet according to the invention are cylindrical lenses. The convex surface of the cylindrical lens has a curvature and therefore is not easily damaged, which eliminates the necessity of a protection film.

Preferably, the direction in which the cylindrical lenses are arranged is orthogonal to the direction in which the prisms are arranged.

In this way, the lenticular lens resin layer and the filling resin layer collect light in different axial directions. Therefore, the front side brightness is more improved. The viewing angles in the two axial directions can be controlled using the single lens sheet. More specifically, the use of the single lens sheet according to the invention allows the angular distributions of brightness in two axial directions each to be a natural light distribution in which the brightness is peaked at the front surface and gradually lowered as the angle widens.

Preferably, the lenticular lens resin layer is formed by the following method. Ionizing radiation curing resin is filled on the surface of a first roll plate having cylindrical lens transfer grooves arranged in the axial direction on the surface. Then, the filled ionizing radiation curing resin is transferred to one surface of the base film. After the transfer, the resin is cured by ionizing irradiation, so that the lenticular lens resin layer is formed.

The prism resin layer is formed by the following method. Ionizing radiation curing resin is filled on the surface of a second roll plate having a plurality of prism transfer grooves arranged in the circumferential direction on the surface. The cross sectional shape of the groove is the same as the cross sectional shape of the prism. The filled ionizing radiation curing resin is transferred onto the other surface of the base film. After the transfer, the resin is cured by ionizing irradiation, so that the prism resin layer is formed.

The filling resin layer is formed by applying resin on a surface of the formed prism resin layer.

Herein, the ionizing irradiation refers to ultraviolet or electron beam irradiation. The ionizing radiation curing resin is resin curably by ionizing irradiation.

When a lens sheet in which the arrangement direction of the prisms is orthogonal to the arrangement direction of the cylindrical lenses is produced using a roll plate, a first roll plate provided with cylindrical lens transfer grooves in the axial direction and a second roll plate provided with prism transfer grooves in the circumferential direction. In this way, the manufacturing yield is maximized.

When the cylindrical lens transfer grooves of the first roll plate are arranged in the circumferential direction, the transferred ionizing irradiation resin could be removed during the manufacture by acute edges (flanges) of the transfer grooves. Therefore, the cylindrical lens transfer grooves are arranged in the axial direction and the prism transfer grooves of the second roll plate are arranged in the circumferential direction, so that the transferred resin can be restrained from being removed by the roll plate.

The apex angle of the prism is at least 90°.

When the apex angle of the prism is less than 90°, the apex angle at the bases of the prism transfer grooves of the second roll plate is less than 90°. In this case, second ionizing radiation curing resin transferred to the surface of the base resin layer could be removed by edges (flanges) of the prism transfer grooves. Therefore, the apex angle of the prism is preferably at least 90°.

The arrangement direction of the cylindrical lenses may be the same as the arrangement direction of the prisms, but in this case, it is preferable that at least the cylindrical lenses or the prisms extend in the lengthwise direction in a wave line shape.

This can restrain moire fringes.

A backlight according to the invention includes a lens sheet for the backlight. A display device according to the invention includes the above-described backlight. A liquid crystal display device according to the invention includes the above-described backlight and a liquid crystal panel provided on the backlight.

BRIEF DESCRIPTION OF THE INVENTION

FIG. 7B is a schematic view for use in illustrating the path of a light beam incident to the collimate layer in FIG. 5;

BEST MODE FOR CARRYING OUT THE INVENTION

Figure 1:
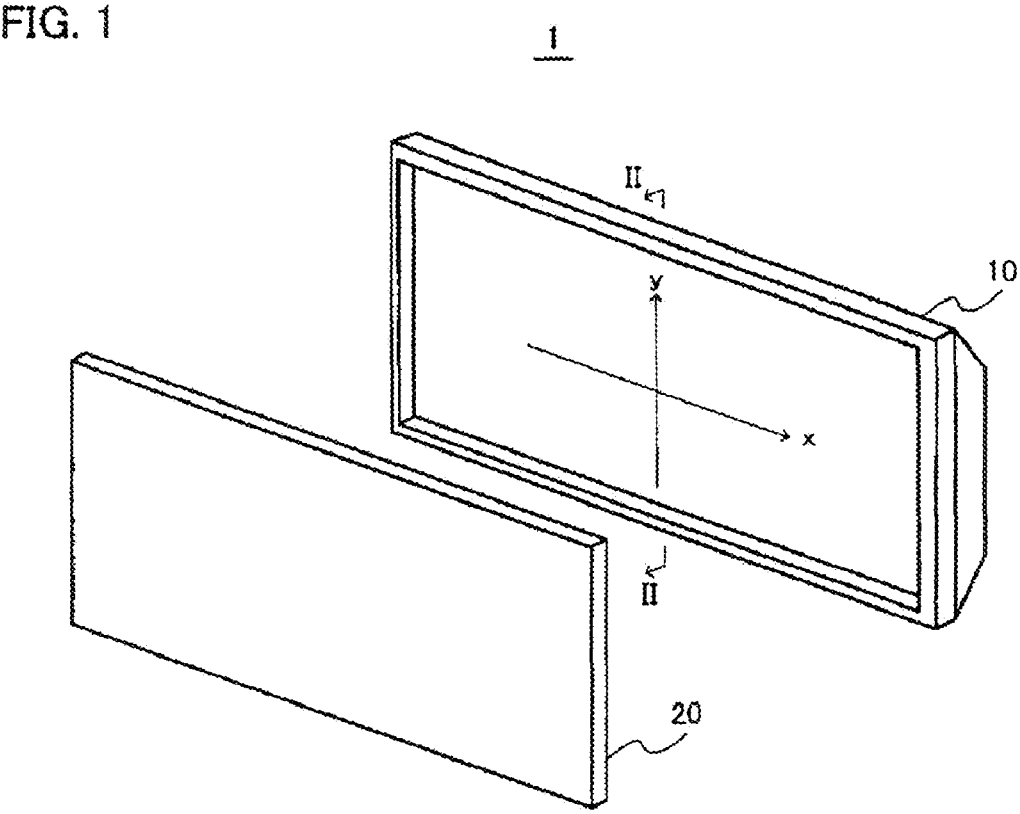
FIG. 1 is a perspective view of a display device including a lens sheet according to an embodiment of the invention.

Embodiments of the present invention will be described in detail in conjunction with the drawings in which the same or corresponding portions are denoted by the same reference characters and their description equally applies.

General Structure

Figure 2:
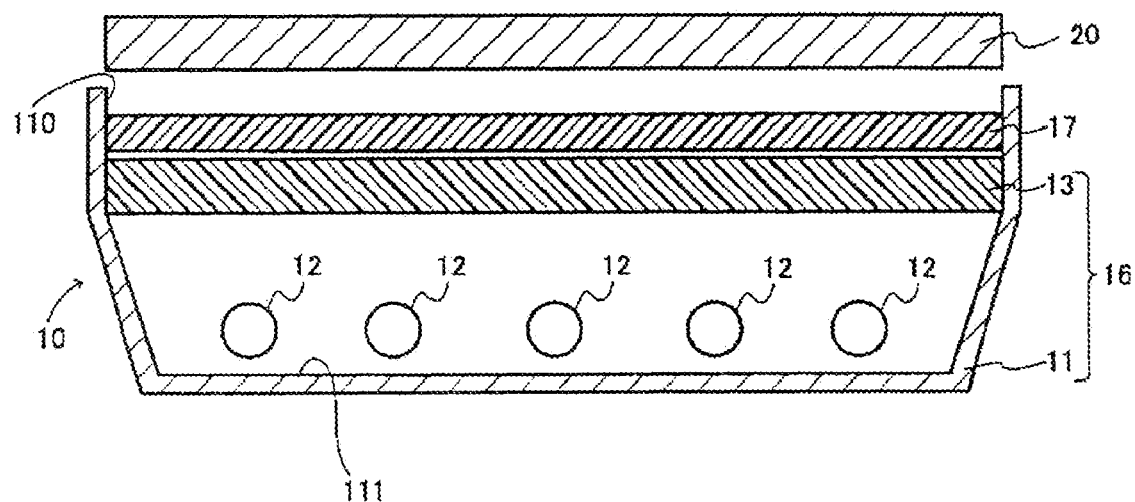
FIG. 2 is a sectional view taken along line II-II in FIG. 1.

With reference to FIGS. 1 and 2, a display device 1 includes a backlight 10 and a liquid crystal panel 20 provided at the front surface of the backlight 10. The backlight 10 includes a surface light source 16 that emits diffused light and a lens sheet 17 provided on the surface light source 16.

Surface Light Source

The surface light source 16 includes a housing 11, a plurality of cold cathode fluorescent lamps 12 and a light diffuser plate 13. The housing 11 is a case having an opening 110 at the front and stores the cold cathode fluorescent lamps 12 inside. The inside surface of the housing 11 is covered with an anti-reflection film 111. The anti-reflection film 111 diffusely reflects light emitted from the cold cathode fluorescent lamps 12 and guides the light to the opening 110. The anti-reflection film 111 may be for example Lumirror® E60L or E60V manufactured by Toray Industries, Inc. and preferably has a diffuse reflectance of 95% or more.

The plurality of cold cathode fluorescent lamps 12 are arranged in parallel in the vertical direction (y-direction in FIG. 1) in front of the back surface of the housing 11. The cold cathode fluorescent lamps 12 are so-called line light sources such as a fluorescent tube that extend in the horizontal direction (x-direction in FIG. 1). Note that a plurality of point light sources such as an LED (Light Emitting Device) may be stored in the housing 11 instead of the cold cathode fluorescent lamps 12. Alternatively, line light sources such as a hot cathode fluorescent lamp and an external electrode fluorescent lamp may be stored in the housing 11 instead of the cold cathode fluorescent lamps 12.

The light diffuser plate 13 is fitted into the opening 110 and provided in parallel to the back surface of the housing 11. The light diffuser plate 13 is fitted into the opening 110 so that the inside of the housing 11 is enclosed, and light from the cold cathode fluorescent lamps 12 can be prevented from being emitted to the outside of the housing 11 from any part other than from the light diffuser plate 13, which can improve the light use efficiency.

The light diffuser plate 13 diffuses light from the cold cathode fluorescent lamps 12 and light reflected by the anti-reflection film 111 and emits the light to the front surface. The light diffuser plate 13 includes a transparent base material and a plurality of particles dispersed in the base material. The refractive index of the particles dispersed in the base material to light having a wavelength in the visible light range is different from that of the base material, and therefore light incident to the light diffuser plate 13 is diffusely transmitted. Examples of the base material of the light diffuser plate 13 may include glass and resin such as polyester-based resin, polycarbonate-based resin, polyacrylate-based resin, alicyclic polyolefin-based resin, polystyrene-based resin, polyvinyl chloride-based resin, polyvinyl acetate-based resin, polyether sulfonate-based resin, and triacetylcellulose-based resin. The light diffuser plate 13 also serves as a supporter for the lens sheet 17.

Lens Sheet

Figure 3:
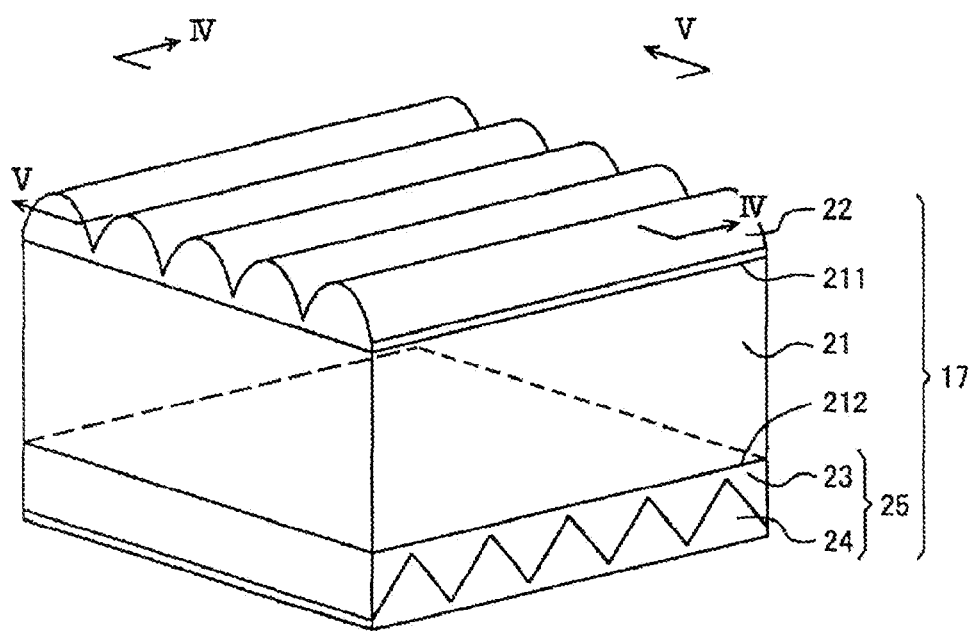
FIG. 3 is a perspective view of a lens sheet according to an embodiment of the invention.
Figure 4:
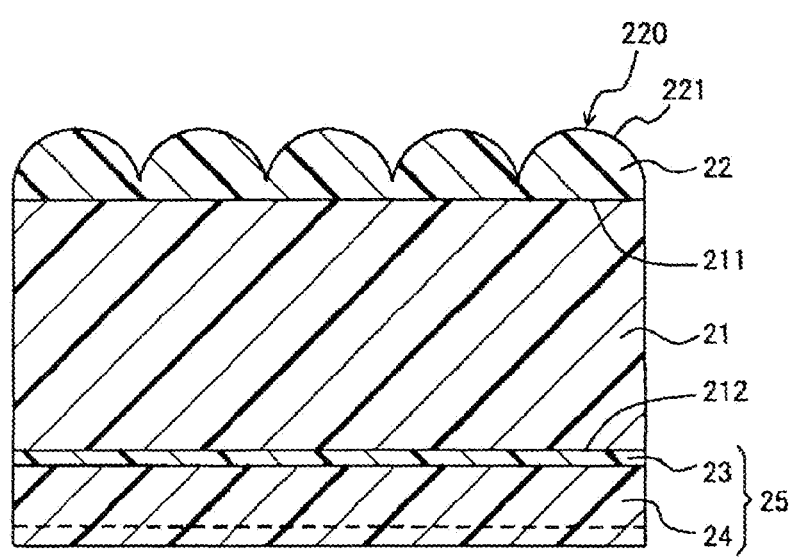
FIG. 4 is a sectional view taken along line IV-IV in FIG. 3.
Figure 5:
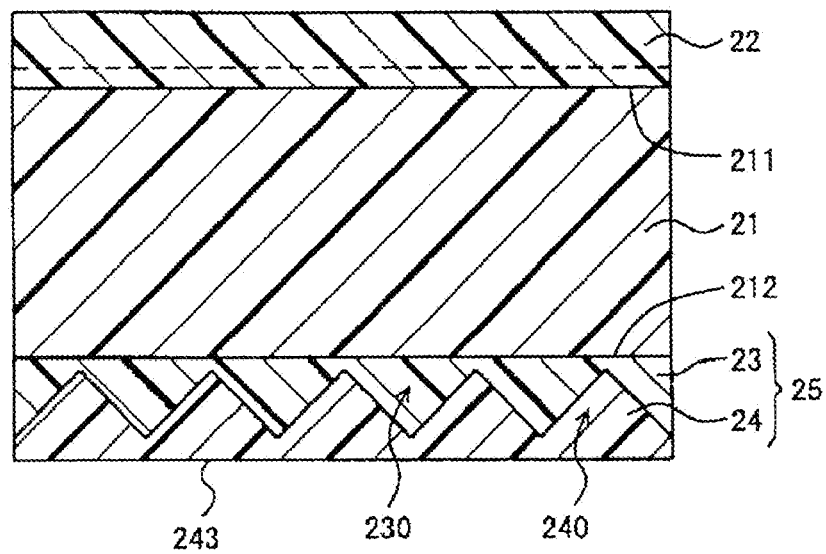
FIG. 5 is a sectional view taken along line V-V in FIG. 3.

With reference to FIGS. 3 to 5, the lens sheet 17 includes a base film 21, a lenticular lens resin layer (hereinafter simply as "lenticular lens layer") 22 formed on one surface 211 of the base film 21, and a collimate layer 25 formed on the other surface 212 of the base film 21. These elements are integrally formed.

The base film 21 is transparent to wavelengths in the visible light range. Examples of the base film 21 may include glass and resin such as polyester-based resin, polycarbonate-based resin, polyacrylate-based resin, alicyclic polyolefin-based resin, polystyrene-based resin, polyvinyl chloride-based resin, polyvinyl acetate-based resin, polyether sulfonate-based resin, and triacetylcellulose-based resin. The surfaces 211 and 212 of the base film 21 are both flat. The base film 21 may be a film type, sheet type, or plate type.

The lenticular lens layer 22 is formed on the surface 211. The lenticular lens layer 22 includes a plurality of cylindrical lenses 220 arranged. The cylindrical lenses 220 are arranged in the vertical direction (y-direction in FIG. 1) of the screen of the display device 1.

The convex surface 221 of the cylindrical lens 220 has a curvature and therefore the apex of the lens is not easily damaged for example in the process of manufacturing a backlight. Therefore, a protection film is not necessary.

Figure 6A:
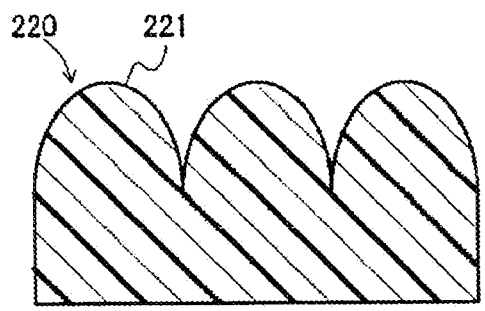
FIG. 6A is a cross sectional view of a lenticular lens layer different from the lenticular lens layer in FIG. 3.
Figure 6B:
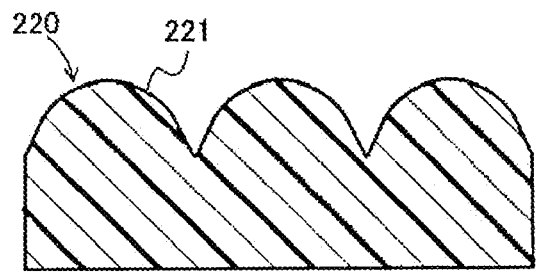
FIG. 6B is a cross sectional view of another lenticular lens layer different from the lenticular lens layers in FIGS. 3 and 6A.

The cross sectional shape of each of the convex surfaces 221 of the cylindrical lenses 220 shown in FIGS. 3 to 5 is a circular arc, while the shape may be an elliptical arc as shown in FIG. 6A or an arc with the edge vicinities being straight as shown in FIG. 6B.

The collimate layer 25 includes a filling resin layer 24 (hereinafter simply as "filling layer 24") and a prism resin layer 23 (hereinafter simply as "prism layer 23").

The prism layer 23 includes a plurality of liner prisms (hereinafter simply as "prisms") 230 formed on the surface 212 of the base film 21 and arranged.

The filling layer 24 is filled on the surface provided with the arranged prisms 230 of the prism layer 23. The part of the filling layer 24 filled between the plurality of prisms 230 forms prisms 240. Since the prisms 230 are arranged, the plurality of prisms 240 are also arranged. The surface 243 opposite to the surface with the prisms 240 is flat.

The prisms 230 and 240 are arranged in the vertical direction (x-direction in FIG. 1) of the screen of the display device 1. Therefore, the arrangement direction of the cylindrical lenses 220 is orthogonal to the arrangement direction of the prisms 230 and 240. In this way, the single lens sheet 17 can adjust the angular distribution of brightness in two axial directions (the vertical and horizontal directions according to the embodiment). More specifically, the collimate layer 25 controls the horizontal viewing angle and a natural light distribution in which the brightness is peaked at the front surface and gradually lowered as the angle widens results. The lenticular lens layer 22 controls the vertical viewing angle and a natural light distribution in which the brightness is peaked at the front surface and gradually lowered as the angle widens results.

The lenticular lens layer 22, the prism layer 23, and the filling layer 24 are made of resin. More specifically, the lenticular lens layer 22 and the prism layer 23 are made of ionizing radiation curing resin. The ionizing radiation curing resin is resin curable by ionizing irradiation such as ultraviolet or electron beam irradiation and examples of the resin may include polyester-based acrylate resin, urethane-based acrylate resin, polyether-based acrylate resin, epoxy-based acrylate resin, polyester-based methaerylate resin, urethane-based methacrylate resin, polyether-based methacrylate resin, and epoxy-based methacrylate resin. The filling layer 24 may be made of ionizing radiation curing resin or any other resin such as polycarbonate and polystyrene.

Refractive Index of Each Layer in Lens Sheet

The refractive index n23 of the prism layer 23 has a relation represented by the following Expression (1) with the refractive index 24n of the filling layer 24, and a relation represented by the following Expression (2) with the refractive index n21 of the base layer 21.

$$n23<n24 \tag{1}$$

$$n23<n21 \tag{2}$$

In short, the refractive index n23 is smaller than the refractive indexes n24 and n21. Note that the prism layer 23 is made of resin as described above, and therefore the refractive index n23 is larger than the refractive index na of the air (=1.0).

The refractive index n24 of the filling layer 24 is larger than the refractive index n23 of the prism layer 23 and therefore the collimate layer 25 collimates a light beam incident to the filling layer 24 to the front surface and emits it to the base film 21. If the refractive index n24 is raised, the refractive angle of the light beam at the lower surface 243 of the filling layer 24 increases. The light beam collimated at the lower surface 243 reaches the surface of the prism 240 and further collimated to the front surface. Therefore, as the refractive index n24 increases, the front side brightness increases. As a preferable refractive index n24 for the filling layer 24, $1.5<n24 \leq 1.8$ holds. However, if the refractive index n24 is not more than 1.5 and larger than the refractive index n23, the advantage of the invention can be obtained to some extent.

The refractive index of the prism layer 23 is smaller than the refractive index of the filling layer 24 and yet larger than the refractive index na (=1.0) of the air. Therefore, the critical angle of the light beam incident to the surface of the prism 240 in the collimate layer 25 increases. If the critical angle increases, the light beam incident to the filling layer 24 is less likely to be totally reflected, and therefore side lobe light can be restrained from being emitted. This will be described in the following paragraphs. As for a preferable refractive index n23 for the prism layer 23, $1.3 \leq n23<1.5$ holds. However, if the refractive index n23 is outside of the above-described range and the refractive index n23 satisfies Expression (1) and (2), the advantage of the invention can be obtained to some extent.

The refractive index n21 of the base film 21 is larger than the refractive index n23. Therefore, light collected at the front surface by the collimate layer 25 is further collimated to the front surface when it comes into the surface 212 of the base film 21. Therefore, the base film 21 contributes to improvement of the front side brightness.

The lens sheet 17 having the above-described structure can restrain side lobes from being generated and can improve the front side brightness. Now, the effects will be described in detail.

Restraining Side Lobes

The lens sheet 17 restrains side lobes from being generated in the horizontal viewing angle by the collimate layer 25 and the lenticular lens layer 22 restrains side lobes from being generated in the vertical viewing angle.

Restraining Side Lobes in Horizontal Viewing Angle

The collimate layer 25 in the lens sheet 17 can restrain side lobes from being generated in the horizontal viewing angle. Although it is not exactly clear why the collimate layer 25 restrains the side lobes, the effect may be mainly attributable to the following aspects.

Figure 7A:
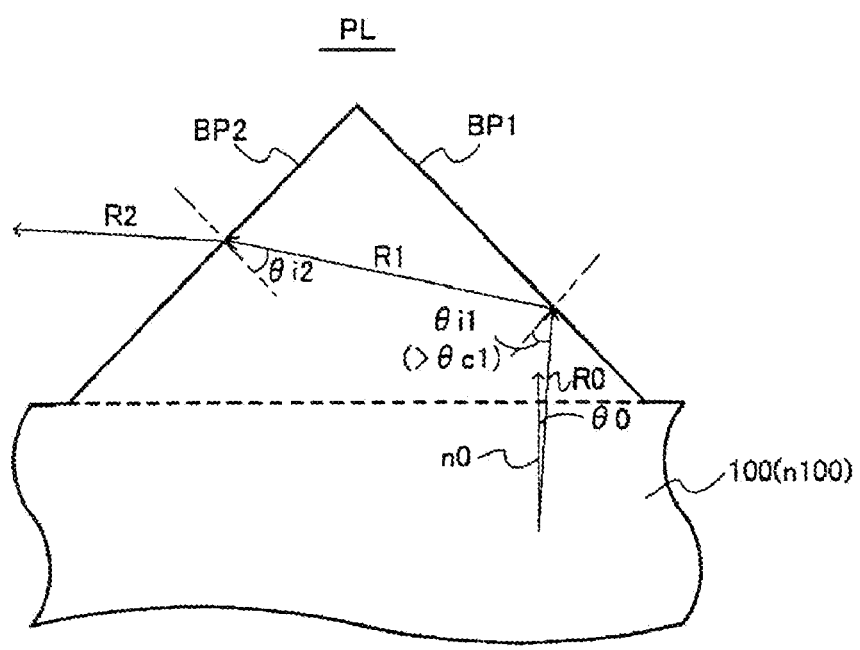
FIG. 7A is a schematic view for use in illustrating the path of a light beam incident to the prism sheet.

The mechanism of how a side lobe is generated in the conventional prism sheet will be described. In FIG. 7A, the light beam incident to the prism PL on the conventional prism sheet 100 includes a light beam R2 that is totally reflected at one side plane BP1 of the prism PL, then transmitted through the other side plane BP2 and emitted outside. The light beam R2 forms a side lobe.

The light beam R0 emitted at an angle of θ0 from the normal line n0 to the outgoing surface of the surface light source 16 (backlight front surface) reaches the side plane BP1 of the prism PL. If the angle of incidence θi1 of the light beam R0 is larger than the critical angle θc1, the light beam R0 is totally reflected and propagates in the prism PL as the light beam R1. When the light beam R1 reaches the side plane BP2, and the angle of incidence θi2 is smaller than the critical angle θc1, the light beam R1 is emitted outside as side lobe light R2 with a wide angle with respect to the normal line n0 (front surface).

The collimate layer 25 restrains side lobe light from being generated. With reference to FIG. 7B, the collimate layer 25 includes the prism layer 23 and the filling layer 24 that satisfy the relation represented by Expression (1) and the prisms 240 are filled between a plurality of prisms 230.

Now, assume that the refractive index n24 of the filling layer 24 is the same as the refractive index n100 of the prism sheet 100. In this case, the relative refractive index of a light beam incident to the prism layer 23 from the filling layer 24 is smaller than the relative refractive index when a light beam comes into the air from the prism sheet 100. This is because the refractive index n23 of the prism layer 23 made of resin is larger than the refractive index of the air (=1.0).

Since the relative refractive index is reduced, the critical angle θc0 at the planes 241 and 242 of the prism 240 in the collimate layer 25 becomes larger than the critical angle θc1 at the planes BP1 and BP2 of the prism PL in the prism sheet 100. As a result, it is considered that at the surface of the prism 240, the ratio of the totally reflected light beam R0 is reduced and side lobe light R2 can be restrained from being emitted.

Restraining Side Lobes at Vertical Viewing Angle

Figure 7C:
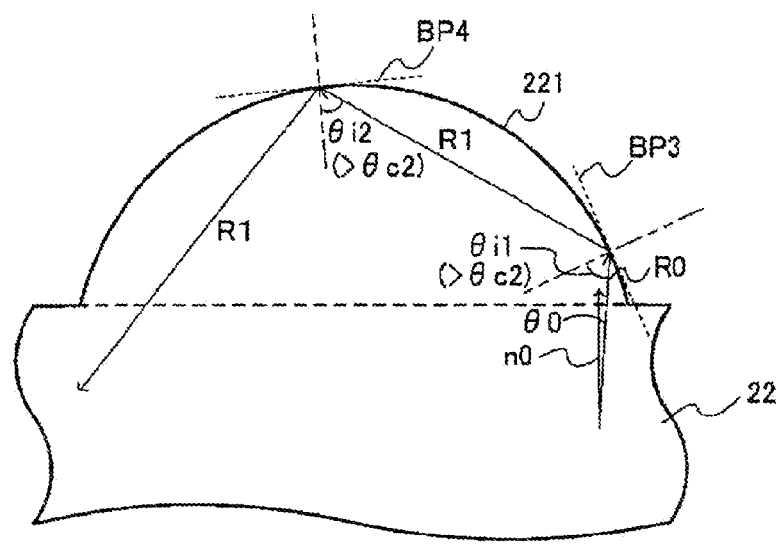
FIG. 7C is a schematic view for use in illustrating the path of light incident to the lenticular lens layer in FIG. 4.

It is not exactly clear why the lenticular lens layer 22 in the lens sheet 17 can restrain the side lobe light from being emitted, but the effect may be mainly attributable to the following aspects. With reference to FIG. 7C, the light beam R0 incident at the same angle θ0 as that in FIG. 7A reaches the boundary plane PB3 on the convex surface 221 of the cylindrical lens 220. If the angle of incidence θi1 of the light beam R0 is greater than the critical angle θc2, the light beam R0 is totally reflected and reaches the boundary plane BP4 on the convex surface. It is often the case that the angle of incidence θi2 of the light beam R0 is greater than the critical angle θc2 at the time. Therefore, the light beam R0 is again totally reflected and returns to the surface light source 16. In short, it is often the case that in the cylindrical lens 220, the light beam once totally reflected is totally reflected again and returns to the surface light source rather than being transmitted and externally emitted. Therefore, the side lobe light R2 can be restrained from being emitted and side lobes can be restrained from being generated in the angular distribution of brightness.

Improvement of Front Side Brightness

In the lens sheet 17, light coming in from the lower surface is collected to the front surface by the collimate layer 25, the base film 21, and the lenticular lens layer 22. Therefore, the front side brightness can be improved using the single sheet.

The refractive index n24 of the filling layer 24 in the collimate layer is larger than the refractive index n23 of the prism layer 23. Therefore, the collimate layer 25 collects diffused light from the surface light source to the front surface and let it be emitted to the base film 21.

The refractive index n21 of the base film 21 is larger than the refractive index n23 of the prism layer 23. Therefore, a light beam incident to the base film 21 from the collimate layer 25 is refracted at the lower surface of the base film 21, further collected to the front surface and emitted to the lenticular lens layer 22.

The lenticular lens layer 22 collects the incoming light beam further to the front surface by the shape of its convex surface 221 and lets it be emitted to the outside.

As in the foregoing, in the lens sheet 17, the collimate layer 25, the base film 21, and the lenticular lens layer 22 each collimate the incoming light beam to the front surface. Therefore, the single lens sheet 17 can improve the front side brightness.

Note that instead of the collimate layer 25, if a collimate layer includes a lenticular lens layer (corresponding to the filling layer 24) including a plurality of cylindrical lenses and a layer with a refractive index lower than the lenticular lens layer (corresponding to the prism layer 23), the light collecting effect by the collimate layer is lowered. This is because the lenticular lens sheet less effectively collects light than the prism sheet. For the same reason, the micro-lens or prism array less effectively collects light. In short, among general lens sheets, the prism sheet collects light most effectively. Therefore, the collimate layer 25 in the lens sheet 17 includes the filling layer 24 having a parallel arrangement of prisms 240.

Manufacturing Method

As an example of a method of manufacturing the lens sheet 17, a manufacturing method by a roll-to-roll method using a roll plate will be described.

Figure 8A:
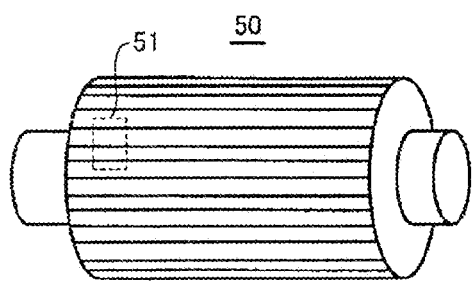
FIG. 8A is a perceptive view of a roll plate for prisms used to produce a lens sheet shown in FIGS. 3 to 5.
Figure 8B:
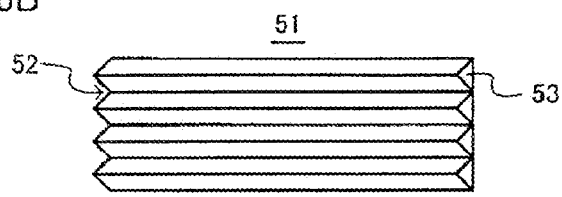
FIG. 8B is an enlarged view of the region 51 in FIG. 8A.

To start with, a collimate layer 25 is formed on the surface 212 of a base film 21. A cylindrical, first roll having the film type base film 21 wound on its surface, and a roll plate 50 for prisms (hereinafter simply as "roll plate 50") having transfer grooves 52 for prisms 230 are prepared as shown in FIGS. 8A and 8B. The cross sectional shape of the transfer groove 52 is the same as the cross sectional shape of the prism 230 and the cross sectional shape of a ridge line 53 corresponding to the edge (flange part) of the transfer groove 52 is the same as the cross sectional shape of the prism 240. The transfer grooves 52 are arranged in the circumferential direction.

The first roll and the roll plate 50 are arranged so that the axial directions of the first roll and the roll plate 50 are parallel to each other. After the arrangement, ionizing radiation curing resin having the refractive index n23 lower than the refractive index n21 of the base film 21 is filled on the surface of the roll plate 50. While the first roll and the roll plate 50 are rotated, the filled ionizing radiation curing resin is transferred on the base film 21 fed from the first roll. At the time, a backup roll opposed to the roll plate 50 with the base film 21 therebetween and the roll plate 50 hold the base film 21 between them for transfer. The transferred ionizing radiation curing resin is subjected to ionizing irradiation and cured, and a prism layer 23 is formed.

After forming the prism layer 23, a filling layer 24 is formed on the prism layer 23. Paint produced by dissolving in a solvent resin having a refractive index n24 higher than the refractive index n23 of the prism layer 23 is prepared. Using a gravure coater, the prepared paint is applied evenly on the prism layer 23. The applied paint is dried and the filling layer 24 is formed.

By the foregoing process, the collimate layer 25 is formed on the surface 212 of the base film 21. The base film 21 having the collimate layer 25 thereon is wound around a second roll. At the time, the prisms 230 and 240 are arranged in parallel in the circumferential direction of the second roll.

Figure 9A:
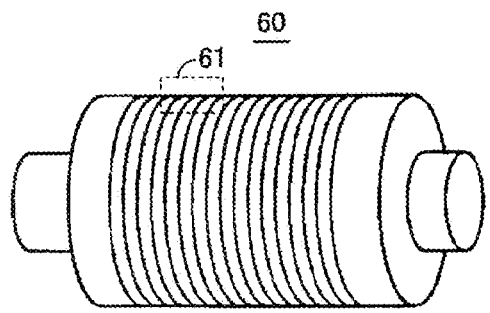
FIG. 9A is a perspective view of a roll plate for lenticular lenses used to produce a lens sheet shown in FIGS. 3 to 5.
Figure 9B:
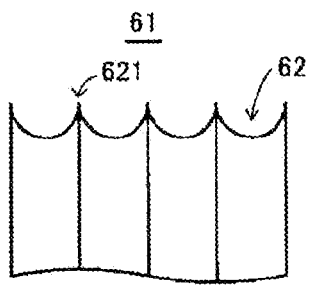
FIG. 9B is an enlarged view of the region 61 in FIG. 9A.

Then, a lenticular lens layer 22 is formed on the surface 211 of the base film 21. A roll plate 60 for a lenticular lens (hereinafter simply as "roll plate 60") shown in FIGS. 9A and 9B is prepared and arranged so that its axial direction is parallel to the axial direction of the second roll. As shown in FIG. 9, transfer grooves 62 for cylindrical lenses 220 arranged in the axial direction are formed on the surface of the roll plate 60.

Ionizing radiation curing resin is filled in the transfer grooves 62 in the roll plate 60. While the second roll and the roll plate 60 are rotated, the filled ionizing radiation curing resin is transferred to the surface 211 of the base film 21 fed from the second roll. At the time, the film is held by a back up roll during the transfer. The transferred ionizing radiation curing resin is subjected to ionizing irradiation and cured, so that a lenticular lens layer 22 is formed. By the above-described process, the lens sheet 17 is formed.

By the above-described manufacturing method, the collimate layer 25 is formed and then the lenticular lens layer 22 is formed, while the lenticular lens layer 22 may be formed first and then the collimate layer 25 may be formed. However, the collimate layer 25 is preferably formed first. When the lenticular lens layer 22 is formed first, the back up roll is pressed against the convex surfaces of the cylindrical lenses 220 of the lenticular lens layer 22 in forming the prism layer 23 in the collimate layer 25. The cylindrical lens 220 could be deformed because of this.

By the above-described manufacturing method, the roll plate 50 having the prism transfer grooves 52 arranged in the circumferential direction and the roll plate 60 having the cylindrical lens transfer grooves 62 arranged in the axial direction are used. Meanwhile, as long as the arrangement direction of the prism transfer grooves 52 and the arrangement direction of the cylindrical lens transfer grooves 62 are orthogonal to each other, the prism transfer grooves 52 may be arranged in a direction other than the circumferential direction, and the cylindrical lens transfer grooves 62 may be arranged in a direction other than the axial direction. However, the use of the roll plate 50 having the prism transfer grooves 52 arranged in the circumferential direction and the roll plate 60 having the cylindrical lens transfer grooves 62 arranged in the axial direction maximizes the manufacturing yield.

Furthermore, the cylindrical lens transfer grooves 62 are preferably arranged in the axial direction and the prism transfer grooves 52 are preferably arranged in the circumferential direction. If the cylindrical lens transfer grooves 62 are arranged in the circumferential direction, the resin transferred from the roll plate to the base film 21 could be removed by the edges 621 of the cylindrical lens transfer grooves.

The cross sectional shape of the prism transfer groove 52 is the same as that of the prism 230, and the vertical angle of the groove bottom of the prism transfer groove 52 (i.e., the vertical angle of the prism 230) is preferably not less than 90°. If the vertical angle of the groove bottom is less than 90°, the resin transferred to the surface 212 of the base film 21 could be removed by the ridge line 53.

By the above-described manufacturing method, the paint is dried to form the filling layer 24, while ionizing radiation curing resin having a refractive index n24 higher than the refractive index n23 may be subjected to ionizing radiation and cured to form the filling layer 24. In this case, using a die coater, the ionizing radiation curing resin may be evenly applied on the prism layer 23 and the applied ionizing radiation curing resin may be subjected to ionizing irradiation.

As described above, as an example of the manufacturing method, the method by the roll-to-roll method using the roll plate is described, while the lens sheet 17 may be produced by other methods. Instead of the roll-to-roll method, the collimate layer 25 and the lenticular lens layer 22 may be formed using a plate shaped roll. The lenticular lens layer 22 may be formed by extrusion, thermal press, or injection.

Other Embodiments

In the lens sheet 17 according to the above-described embodiment, the angle (crossed axes angle) formed by the arrangement directions of the prisms 230 and 240 and the arrangement direction of the cylindrical lenses 220 is 90°, but the crossed axes angle does not have to be 90°. If they cross each other, the viewing angles in the two axial directions can be controlled and the light collecting effect can be obtained to some extent. The crossed axes angle is preferably in the range from 45° to 135°, more preferably 90°.

Figure 10:
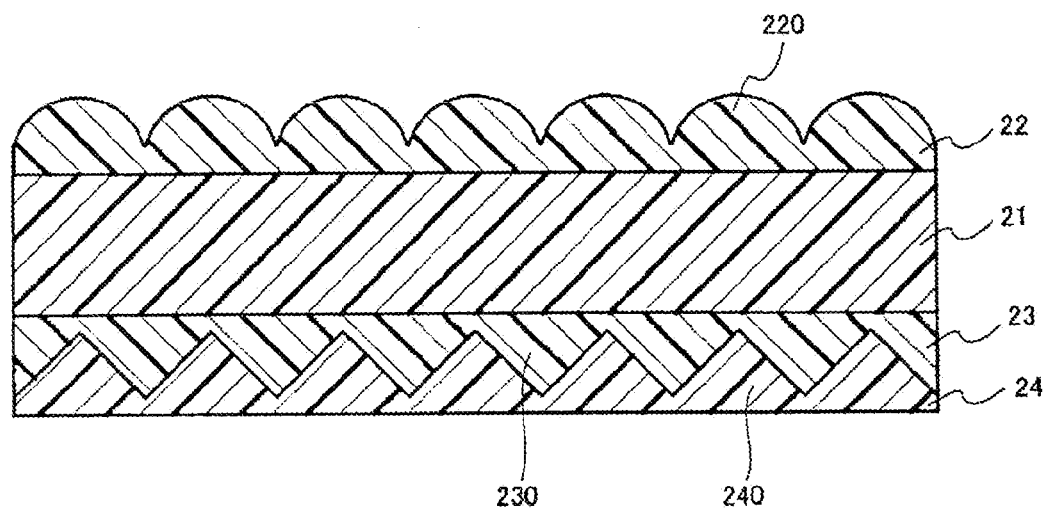
FIG. 10 is a sectional view of another lens sheet having a structure different from the lens sheet in FIG. 3.

As shown in FIG. 10, the arrangement direction of the prisms 230 and 240 may be parallel to the arrangement direction of the cylindrical lenses 220. In this case, the viewing angle only in one axial direction is controlled, but the front side brightness can be improved as compared to the conventional prism sheet and side lobe light can be restrained.

Figure 11:
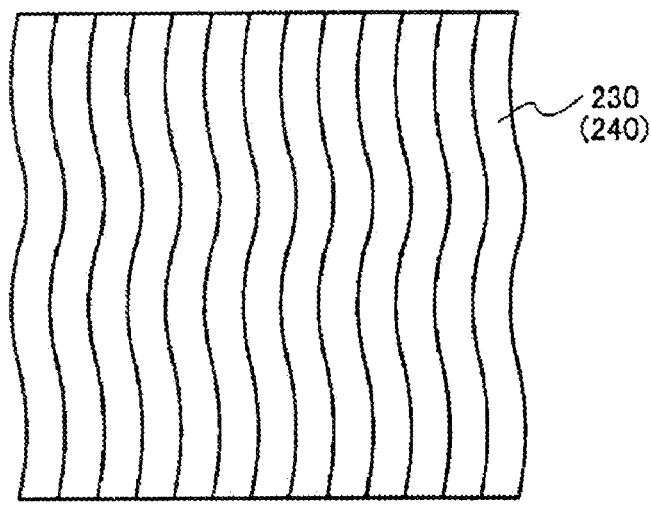
FIG. 11 is a top view of another lens sheet having a structure different from the lens sheets in FIGS. 3 and 8.

As shown in FIG. 10, if the parallel arrangement direction of the prisms 230 and 240 is parallel to the parallel arrangement direction of the cylindrical lenses 220, a moire fringe is generated in some cases. In order to prevent the moire fringe, the length-wise directions of prisms 230 and 240 are preferably arranged in an irregular wave line shape rather than straight as shown in FIG. 11. The prisms 230 and 240 may be arranged in a straight shape, and the cylindrical lenses 220 may be arranged in an irregular wave line manner, or both the cylindrical lenses 220 and the prisms 230 and 240 may be arranged in an irregular wave line manner. The moire fringe is generated when regular patterns are placed on each other. Therefore, at least the prisms 230 and 240 or the cylindrical lenses 220 are arranged in an irregular wave line manner, so that the moire fringe can be restrained.

These lens sheets can be produced by the same manufacturing method as the lens sheet 17.

As in the foregoing, the single lens sheet 17 according to the embodiment can improve the front side brightness and side lobes in the angular distribution of brightness can be restrained when the refractive index n23 of the prism layer 23, the refractive index n24 of the filling layer 24, and the refractive index n21 of the base film 21 satisfy Expressions (1) and (2).

The plurality of prisms 240 in the collimate layer 25 are filled between the plurality of prisms 230 of the prism layer 23 and therefore their apexes are not exposed at the surface. The top surfaces of the cylindrical lenses 220 forming the lenticular lens layer 22 are curved. Therefore, the lenses are less likely to be damaged during the manufacture and transport unlike the apexes of the conventional prism sheet, which eliminates the necessity of a protection sheet for the tops.

The direction in which the prisms 230 and 240 are arranged is orthogonal to the direction in which the cylindrical lenses 220 are arranged, so that the viewing angles in the vertical and horizontal directions on the screen in the liquid crystal display device can be controlled, and the angular distribution of brightness in each of the axial directions can be a natural light distribution peaked at the front surface. Furthermore, the orthogonal arrangement allows light in the two axial directions to be collected to the front surface, so that the front side brightness is further improved. Herein, the "orthogonal" arrangement does not have to be strictly at 90°, but it is only necessary that the angle is in the range that allows the vertical and horizontal viewing angles to be controlled and the light collecting effect to be obtained.

According to the embodiment, the backlight 10 is a direct type but it may be an edge light type.

In FIGS. 3 to 5, the plurality of cylindrical lenses 220 are arranged in contact with one another, but there may be a gap between adjacent cylindrical lenses 220. Similarly, there may be a gap between adjacent prisms 240. The cross sectional shapes of the prisms 230 and 240 are both triangular, but the shapes may be trapezoidal.

First Embodiment

Lens sheets according to Inventive Examples 1 to 6 having shapes and refractive indexes n21 to n24 shown in Table 1 were produced. A prism sheet was produced as a comparative example. The lens sheets according to Inventive Examples 1 to 6 and the prism sheet were examined for their angular distributions of brightness.

TABLE 1

| structure of lens sheet | | Inventive Example 1 | Inventive Example 2 | Inventive Example 3 | Inventive Example 4 | Inventive Example 5 | Inventive Example 6 |
|---|---|---|---|---|---|---|---|
| prism layer 23 | cross sectional shape of prism 230 | isosceles triangle | isosceles triangle | isosceles triangle | isosceles triangle | isosceles triangle | isosceles triangle |
| | width (μm) | 50 | 50 | 50 | 50 | 50 | 50 |
| | vertical angle (°) | 90 | 90 | 90 | 90 | 90 | 90 |
| | pitch (μm) | 50 | 50 | 50 | 50 | 50 | 50 |
| | refractive index n23 | 1.4 | 1.4 | 1.3 | 1.4 | 1.5 | 1.5 |
| filling layer 24 | cross sectional shape of prism 240 | isosceles triangle | isosceles triangle | isosceles triangle | isosceles triangle | isosceles triangle | isosceles triangle |
| | width (μm) | 50 | 50 | 50 | 50 | 50 | 50 |
| | vertical angle (°) | 90 | 90 | 90 | 90 | 90 | 90 |
| | pitch (μm) | 50 | 50 | 50 | 50 | 50 | 50 |
| | refractive index n24 | 1.7 | 1.7 | 1.8 | 1.6 | 1.7 | 1.6 |
| | thickness (μm) | 30 | 30 | 30 | 30 | 30 | 30 |
| base film 21 | thickness (μm) | 250 | 250 | 250 | 250 | 250 | 250 |
| | refractive index n21 | 1.6 | 1.6 | 1.6 | 1.6 | 1.6 | 1.6 |
| lenticular lens layer 22 | cross sectional shape of lens | circular arc | elliptical arc | circular arc | circular arc | circular arc | elliptical arc |
| | radius of curvature of top (μm) | 20 | 17.3 | 20 | 20 | 20 | 17.3 |
| | height (μm) | 20 | 23.7 | 20 | 20 | 20 | 23.7 |
| | contact angle (°) | 75 | 70 | 75 | 75 | 75 | 70 |

TABLE 1-continued

| structure of lens sheet | Inventive Example 1 | Inventive Example 2 | Inventive Example 3 | Inventive Example 4 | Inventive Example 5 | Inventive Example 6 |
| --- | --- | --- | --- | --- | --- | --- |
| pitch (μm) | 50 | 50 | 50 | 50 | 50 | 50 |
| refractive index n22 | 1.54 | 1.54 | 1.54 | 1.54 | 1.54 | 1.54 |

Inventive Example 1

A lens sheet according to Inventive Example 1 in the shape shown in FIGS. 3 to 5 and the prism sheet as the comparative example were produced and examined for the angular distributions of brightness.

Manufacturing Method

The lens sheet according to Inventive Example 1 was produced by the following method. A roll plate for prisms with a surface having prism transfer grooves arranged in the circumferential direction was prepared. The cross sectional shape of each of the prism transfer groove was an isosceles triangle.

A polyethylene terephthalate (PET) film having a thickness of 250 μm and a refractive index (n21) of 1.6 was prepared as the base film 21. The roll plate was filled with ultraviolet curing resin with a refractive index (n23) of 1.4 and pressed against the surface of the PET film, so that the ultraviolet curing resin was transferred. The transferred ultraviolet curing resin was cured by ultraviolet irradiation and thus a prism layer 23 was formed. The cross sectional shape of each of the prisms 230 on the surface of the prism layer 23 was an isosceles triangle, the vertical angle was 90°, the base was 50 μm and the apex to apex distance of adjacent prisms, in other words, the pitch was 50 μm.

Paint produced by dissolving resin with a refractive index (n24) of 1.7 in a solvent was prepared. The prepared paint was applied evenly on the prism layer 23 using a gravure coater. The applied paint was dried and a filling layer 24 as thick as 30 μm was formed.

By the above-described process, the collimate layer 25 was formed on the base film 21, then the lenticular lens layer 22 was formed on the surface 211 of the base film 21 on the opposite side to the surface on which the collimate layer 25 was formed. A roll plate for a lenticular lens with a surface having cylindrical lens transfer grooves arranged in the axial direction was prepared. The cross sectional shape of the transfer groove was a circular arc.

Ultraviolet curing resin with a refractive index of 1.54 was filled in the transfer grooves of the roll plate for the lenticular lenses and transferred onto the surface of the PET film. The transferred ultraviolet curing resin was subjected to ultraviolet irradiation and cured, and the lenticular lens layer 22 was formed. The cross sectional shape of each of the cylindrical lenses 220 on the lenticular lens layer 22 was a circular arc having a radius of curvature of 20 μm and the distance between the lens edges and the top of the convex surface was 20 μm, the angle formed between the convex surface and the plane including the lens edges (hereinafter as "contact angle") was 75°, and the pitch of adjacent cylindrical lenses 220 was 50 μm.

Figure 18:
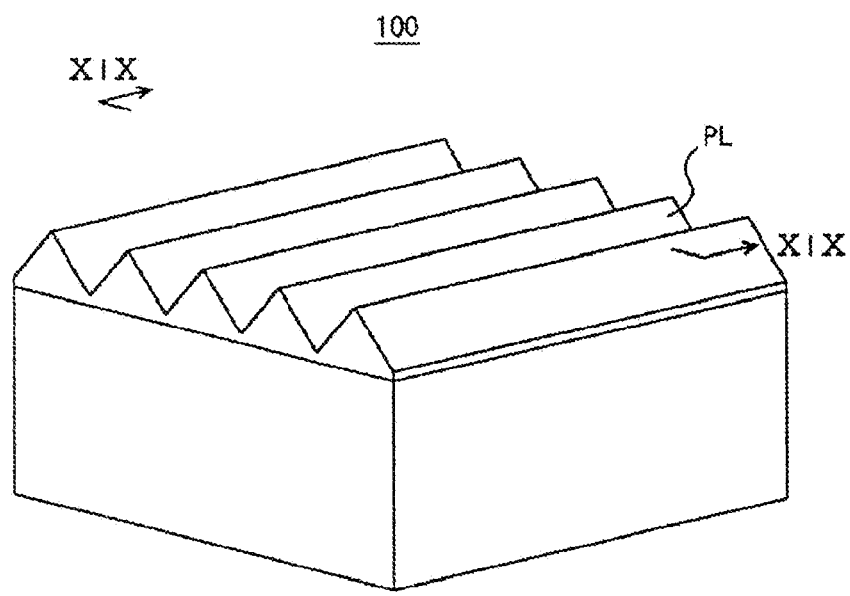
FIG. 18 is a perspective view of a conventional prism sheet.
Figure 19:
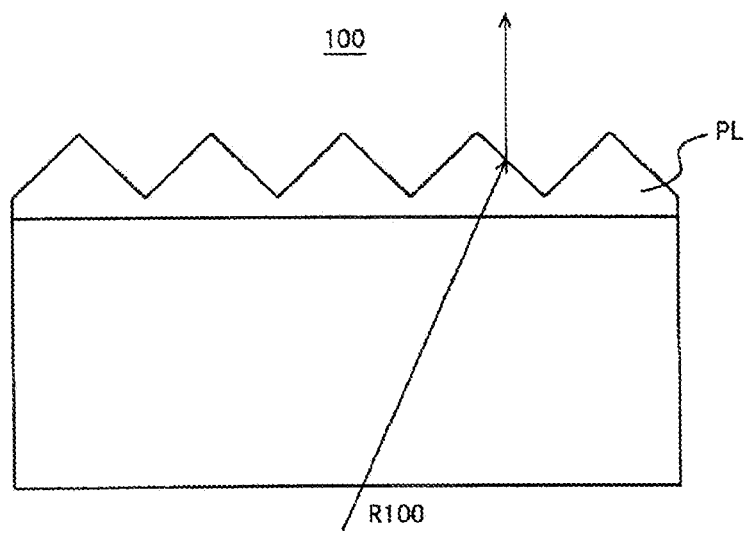
FIG. 19 is a sectional view taken along line XIX-XIX in FIG. 18.

The prism sheet as the comparative example was produced by the following method. Ultraviolet curing resin is applied evenly on a PET film as thick as 250 μm using a die coater and an ultraviolet curing resin layer as thick as 30 μm was formed. Then, a roll plate for prisms was pressed against the ultraviolet curing resin layer and a prism sheet in the shape shown in FIGS. 18 and 19 was produced by ultraviolet irradiation. The prism pitch was 50 μm and the vertical angle was 90°. The refractive index of the PET film was 1.6 and the refractive index of the ultraviolet curing resin was 1.54.

Examination of Angular Distribution of Brightness

Using the produced lens sheet according to Inventive Example 1 and the prism sheet as the comparative example, the angular distribution of brightness was examined. The lens sheet was provided in a housing that stores cold cathode fluorescent lamps and had a reflection film provided at its inner surface and a light diffuser plate fitted to the opening. At the time, the lens sheet was provided so that the cylindrical lenses were arranged in parallel in the vertical direction and the prisms were arranged in the horizontal direction.

After the lens sheet was provided in the housing, the angular distribution of brightness was examined. As for the viewing angles, the normal line direction to the lens sheet (front surface) was set as a 0 degree axis, the inclination from the 0 degree axis in the vertical direction was the vertical viewing angle and the inclination from the 0 degree axis in the horizontal direction was the horizontal viewing angle. The brightness for the vertical and horizontal viewing angles were measured by a brightness photometer. The measuring position was in the center of the lens sheet.

Similarly, the prism sheet as the comparative example was provided in a housing and the angular distribution of brightness was examined. At the time, the prisms were arranged in the vertical direction.

Figure 12:
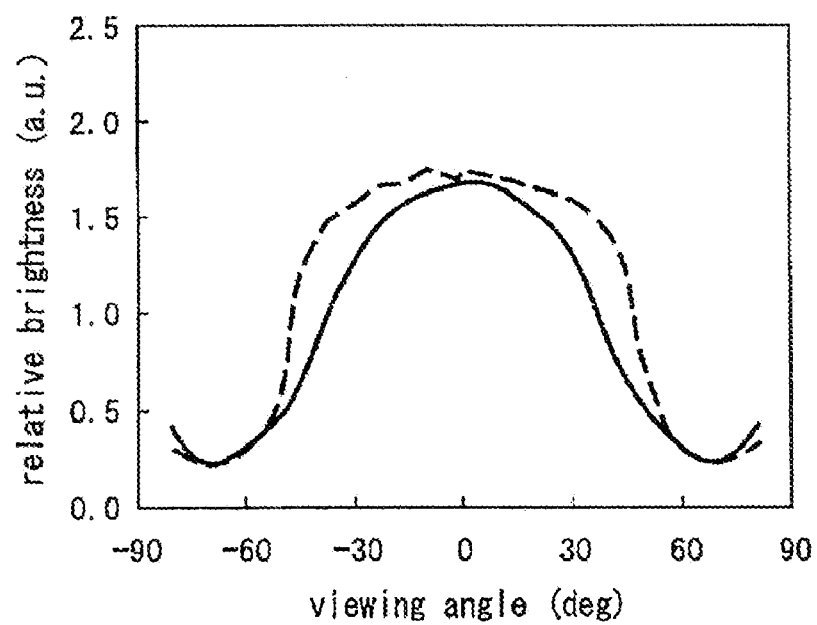
FIG. 12 shows the angular distribution of brightness in a lens sheet according to Inventive Example 1.
Figure 20:
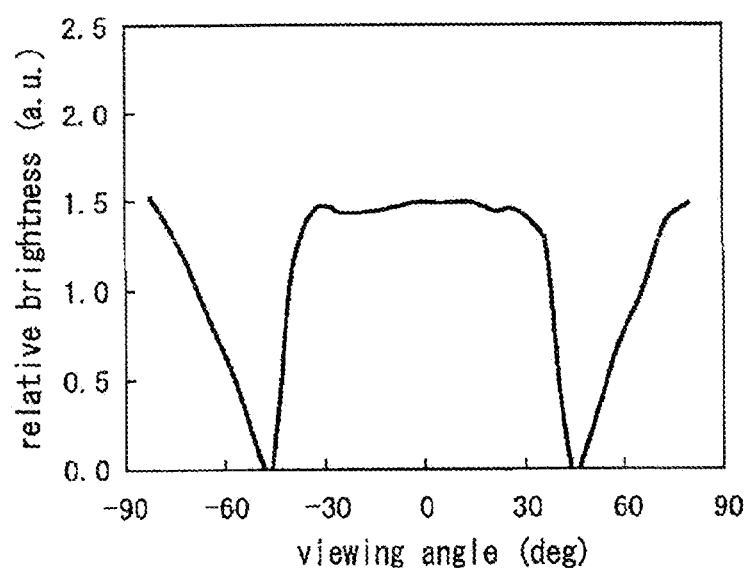
FIG. 20 shows the angular distribution of brightness in the prism sheet in FIG. 18.

The angular distribution of brightness in the lens sheet according to Inventive Example 1 is shown in FIG. 12 and the angular distribution of brightness in the prism sheet as the comparative example is shown in FIG. 20. The abscissas in FIGS. 12 and 20 each represent the viewing angle (deg), the ordinates each represent relative brightness (a. u.) to the brightness of the light diffuser plate in the housing as a reference (1.0). The solid line denotes the angular distribution of brightness for the vertical viewing angle and the dotted line denotes the angular distribution of brightness for the horizontal viewing angle.

With reference to FIGS. 12 and 20, side lobes were generated around viewing angles of −50° to −90° and 50° to 90° in the comparative example, but almost no side lobe was generated for the vertical and horizontal viewing angles in Inventive Example 1.

In the lens sheet according to Inventive Example 1, the vertical viewing angle and the horizontal viewing angle both had a distribution in which the relative brightness is peaked at a viewing angle of 0° and gradually lowered as the viewing angle widens, so that a natural light distribution resulted.

Furthermore, the relative brightness at a viewing angle of 0° was the front side brightness, the front side brightness in the lens sheet according to Inventive Example 1 was 1.12 times the front side brightness in the conventional prism sheet.

Inventive Example 2

A lens sheet according to Inventive Example 2 was produced and examined for the angular distribution of brightness in the same manner as that of Inventive Example 1. As shown in Table 1, the lens sheet according to Inventive Example 2 was different from Inventive Example 1 in that the cylindrical lenses of the lenticular lens layer 22 had a different shape. More specifically, the cross sectional shape of each of the cylindrical lenses was an elliptical arc, its height was 23.7 µm, the radius of curvature of the top was 17.3 µm, the contact angle was 70°, and the pitch of adjacent cylindrical lenses was 50 µm. The other structure was the same as that of the lens sheet according to Inventive Example 1.

The lens sheet according to Inventive Example 2 was provided on a housing as a surface light source similarly to the lens sheet according to Inventive Example 1. More specifically, the cylindrical lenses were arranged in the vertical direction and the prisms were arranged in the horizontal direction. Then, similarly to the first embodiment, the angular distribution of brightness was examined.

Figure 13:
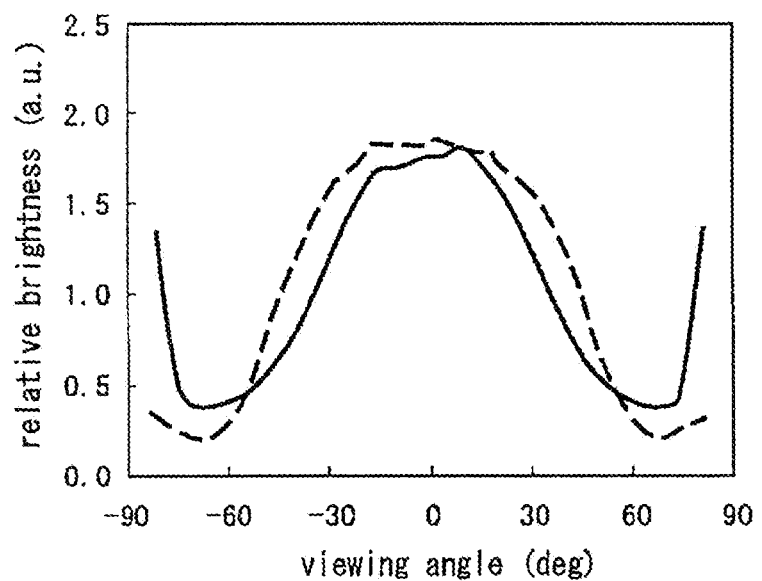
FIG. 13 shows the angular distribution of brightness in a lens sheet according to Inventive Example 2.

The examination result is given in FIG. 13. In comparison with the conventional prism sheet (FIG. 20), side lobes were restrained in Inventive Example 2. Both for the vertical and horizontal viewing angles, the angular distribution of brightness peaked at a viewing angle of 0°, so that a natural light distribution resulted.

The front side brightness in the lens sheet according to Inventive Example 2 was 1.15 times that of the conventional prism sheet and higher than those of the conventional prism sheet and Inventive Example 1. This is probably because the cross sectional shape of the cylindrical lens was an elliptical arc, and the light collecting effect by the lenticular lens layer 22 improved as compared to the lens sheet according to Inventive Example 1 in which the cross sectional shape was a circular arc.

Inventive Example 3

A lens sheet according to Inventive Example 3 was produced and examined for the angular distribution of brightness similarly to Inventive Example 1. As shown in Table 1, the lens sheet according to Inventive Example 3 had different values for the refractive indexes n23 and n24 from those according to Inventive Example 1. More specifically, the refractive index n23 (1.3) was smaller than that in Inventive Example 1 and the refractive index n24 (1.8) was larger than that in Inventive Example 1. The other structure was the same as that of Inventive Example 1.

Figure 14:
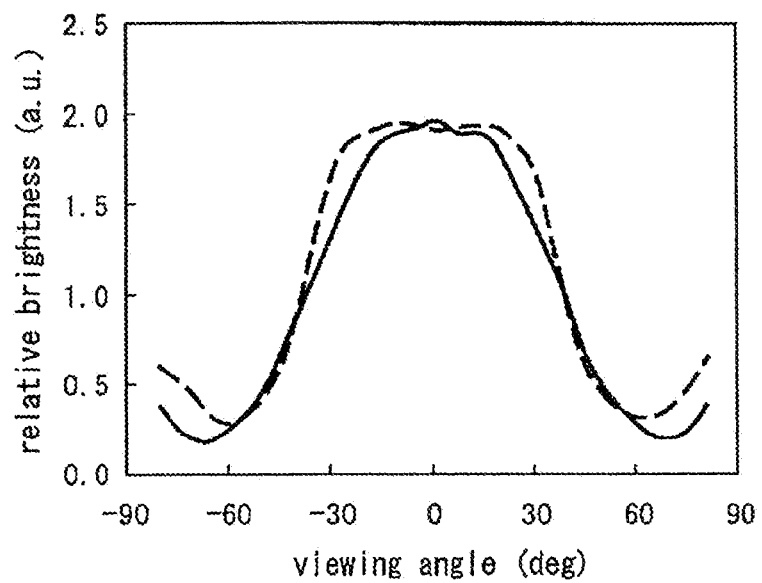
FIG. 14 shows the angular distribution of brightness in a lens sheet according to Inventive Example 3.

The examination result is given in FIG. 14. According to Inventive Example 3, both for the vertical and horizontal viewing angles, side lobes were restrained. Both for the vertical and horizontal viewing angles, the distribution of brightness was peaked at a viewing angle of 0°, so that a natural light distribution resulted.

The front side brightness in the lens sheet according to Inventive Example 3 was 1.30 times the front side brightness of the conventional prism sheet and higher than those of the conventional prism sheet and Inventive Example 1. This is probably because the relative refractive index when light is incident to the prism layer 23 from the filling layer 24 was lower than that in Inventive Example 1 and the relative refractive index when light is incident to the base film 21 from the prism layer 23 was high. Therefore, it is believed that the front side brightness improved as compared to Inventive Example 1.

Inventive Example 4

A lens sheet according to Inventive Example 4 was produced and examined for the angular distribution of brightness by the same method as that in Inventive Example 1. The filling layer 24 in Inventive Example 4 was produced by a method different from that in Inventive Example 1. More specifically, ultraviolet curing resin with the above-described refractive index (n24) of 1.6 was evenly applied on the formed prism layer 23 using a die coater. The applied ultraviolet curing resin had its surface pressed against a surface flat roll while being subjected to ultraviolet irradiation and is cured into the filling layer 24. The other part of the manufacturing method was the same as that in Inventive Example 1.

As shown in Table 1, the lens sheet according to Inventive Example 4 had a refractive index n24 lower than that in Inventive Example 1. The other structure was the same as that in Inventive Example 1.

Figure 15:
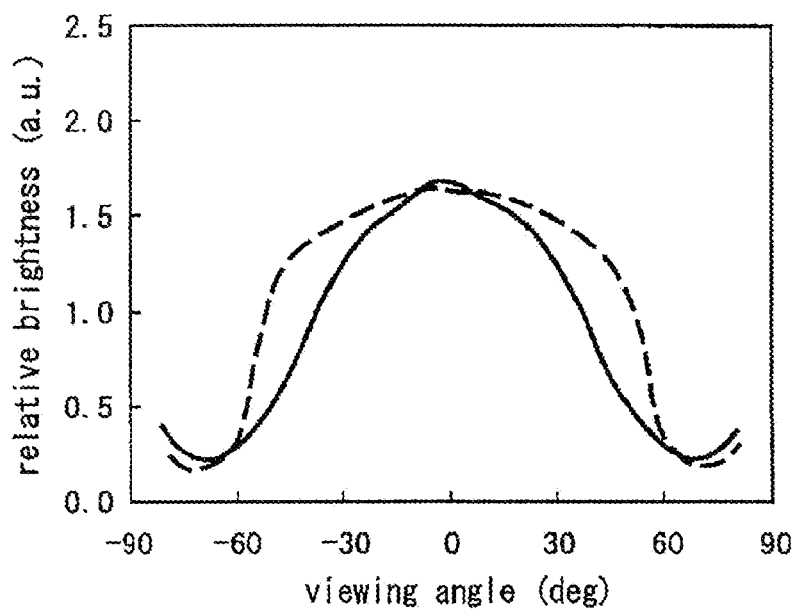
FIG. 15 shows the angular distribution of brightness in a lens sheet according to Inventive Example 4.

The examination result is given in FIG. 15. In Inventive Example 4, both for the vertical and horizontal viewing angles, side lobes were restrained. Both for the horizontal and vertical angles, a natural light distribution peaked at a viewing angle of 0° resulted.

The front side brightness of the lens sheet according to Inventive Example 4 was 1.07 times the front side brightness of the conventional prism sheet, in other words higher than that of the conventional prism sheet. However, the brightness was lower than the front side brightness in Inventive Example 1. This is probably because the refractive index n24 of the filling layer 24 was lower than that in Inventive Example 1, so that the light collecting effect at the collimate layer 25 was lower.

Inventive Example 5

A lens sheet according to Inventive Example 5 was produced by the same manufacturing method as that in Inventive Example 4. As shown in Table 1, the lens sheet according to Inventive Example 5 had a refractive index n23 of 1.5 that is higher than that in Inventive Example 1. The other structure was the same as that in Inventive Example 1.

Figure 16:
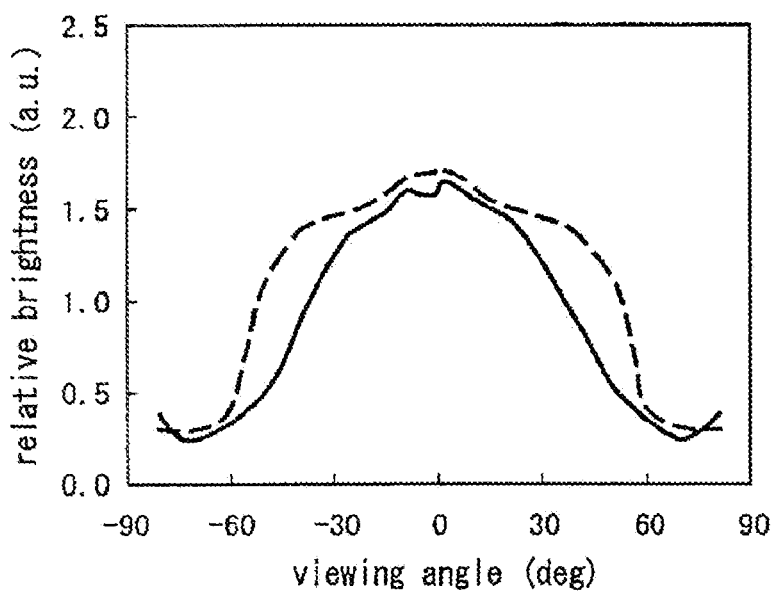
FIG. 16 shows the angular distribution of brightness in a lens sheet according to Inventive Example 5.

The examination result is given in FIG. 16. In Inventive Example 5, both for the vertical and horizontal viewing angles, side lobes were restrained. Both for the horizontal and vertical angles, a natural light distribution peaked at a viewing angle of 0° resulted.

The front side brightness of the lens sheet according to Inventive Example 5 was 1.05 times the front side brightness of the conventional prism sheet, in other words higher than that of the conventional prism sheet. However, the brightness was lower than the front side brightness in Inventive Example 1. This is probably because the refractive index n23 was lower than that in Inventive Example 1 and the light collecting effect at the collimate layer 25 was lower.

Inventive Example 6

A lens sheet according to Inventive Example 6 was produced according to the same manufacturing method as that in Inventive Example 4. As shown in Table 1, the lens sheet according to Inventive Example 6 had a refractive index n23 of 1.5 that is higher than that in Inventive Example 1. The refractive index n24 was 1.6 that is lower than that in Inventive Example 1. The other structure was the same as that in Inventive Example 1. The cross sectional shape of the cylindrical lenses on the lenticular lens layer 22 was the same elliptical arc shape as that in Inventive Example 2.

Figure 17:
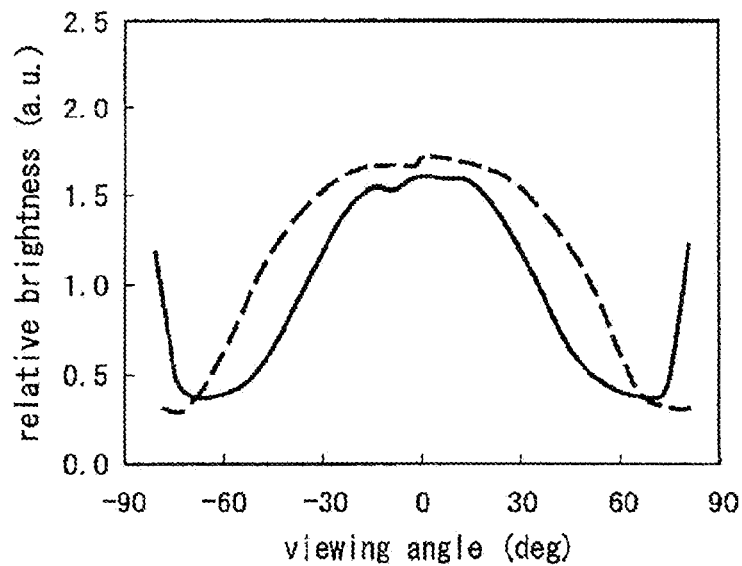
FIG. 17 shows the angular distribution of brightness in a lens sheet according to Inventive Example 6.

The examination result is given in FIG. 17. In Inventive Example 6, both for the vertical and horizontal viewing angles, side lobes were restrained. Both for the horizontal and vertical angles, a natural light distribution peaked at a viewing angle of 0° resulted.

The front side brightness of the lens sheet according to Inventive Example 6 was slightly higher than that of the conventional prism sheet. However, the brightness was lower than the front side brightness in Inventive Example 1. This is probably because the refractive index n24 was lower than that in Inventive Example 1 and the light collecting effect at the collimate layer was lower.

Although the embodiments of the present invention have been described, the same is by way of illustration and example only and is not to be taken by way of limitation. The invention may be embodied in various modified forms without departing from the spirit and scope of the invention.

The invention claimed is:

1. A lens sheet for use in a backlight, comprising:
   a base film;
   a lenticular lens resin layer formed on one surface of said base film and including a plurality of cylindrical lenses arranged;
   a prism resin layer formed on the other surface of said base film, including a plurality of prisms arranged and having a lower refractive index than the refractive index of said base film; and
   a filling resin layer filled on a surface of said prism resin layer provided with said arranged prisms and having a higher refractive index than the refractive index of said prism resin layer.

2. The lens sheet according to claim 1, wherein the direction in which said cylindrical lenses are arranged crosses the direction in which said prisms are arranged.

3. The lens sheet according to claim 2, wherein the direction in which said cylindrical lenses are arranged is orthogonal to the direction in which said prisms are arranged.

4. The lens sheet according to claim 3, wherein said lenticular lens resin layer is produced by filling ionizing radiation curing resin on a surface of a first roll plate having cylindrical lens transfer grooves arranged in the axial direction on the surface, transferring said filled ionizing radiation curing resin to one surface of said base film and then curing said resin by ionizing irradiation,
   said prism resin layer is formed by filling ionizing radiation curing resin on a surface of a second roll plate having a plurality of prism transfer grooves arranged in the circumferential direction on the surface, the cross sectional shape of said prism transfer groove being and the same as that of said prism, transferring said filled ionizing radiation curing resin on the other surface of said base film and then curing the resin by ionizing irradiation, and
   said filling resin layer is formed by applying resin on a surface of the formed prism resin layer.

5. The lens sheet according to claim 4, wherein the apex angle of said prism is at least 90°.

6. The lens sheet according to claim 1, wherein said arrangement direction of said cylindrical lenses is the same as the arrangement direction of said prisms,
   at least said cylindrical lenses or said prisms extend in the lengthwise direction in a wave line shape.

7. A backlight comprising a lens sheet, said lens sheet comprising:
   a base film;
   a lenticular lens resin layer formed on one surface of said base film and including a plurality of cylindrical lenses arranged;
   a prism resin layer formed on the other surface of said base film, including a plurality of prisms arranged, and having a lower refractive index than the refractive index of said base film; and
   a filling resin layer filled on a surface of said prism resin layer provided with said arranged prisms and having a higher refractive index than the refractive index of said prism resin layer.

8. A display device comprising a backlight including a lens sheet, said lens sheet comprising:
   a base film;
   a lenticular lens resin layer formed on one surface of said base film and having a plurality of cylindrical lenses arranged;
   a prism resin layer formed on the other surface of said base film, having a plurality of prisms arranged and having a lower refractive index than the refractive index of said base film; and
   a filling resin layer filled on a surface of said prism resin layer provided with said arranged prisms and having a higher refractive index than the refractive index of said prism resin layer.

9. A display comprising:
   a backlight including a lens sheet, said lens sheet comprising a base film, a lenticular lens resin layer formed on one surface of said base film and having a plurality of cylindrical lenses arranged, a prism resin layer formed on the other surface of said base film, having a plurality of prisms arranged and having a lower refractive index than the refractive index of said base film, and a filling resin layer filled on a surface of said prism resin layer provided with said arranged prisms and having a higher refractive index than the refractive index of said prism resin layer; and
   a liquid crystal panel provided on said backlight.

* * * * *